United States Patent
Huang et al.

(10) Patent No.: US 10,721,310 B2
(45) Date of Patent: Jul. 21, 2020

(54) DEVICE REDIRECTION SUPPORT AT THIN CLIENT

(71) Applicant: AMZETTA TECHNOLOGIES, LLC, Norcross, GA (US)

(72) Inventors: Derek Huang, Taoyuan (TW); Tommy Hu, Taipei (TW); Yugender P. Subramanian, Duluth, GA (US); Indira Valmiki, Anantapur (IN)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 213 days.

(21) Appl. No.: 15/221,292

(22) Filed: Jul. 27, 2016

(65) Prior Publication Data

US 2018/0034938 A1    Feb. 1, 2018

(51) Int. Cl.
*H04L 29/08* (2006.01)
*H04L 12/26* (2006.01)

(52) U.S. Cl.
CPC ............ *H04L 67/148* (2013.01); *H04L 43/10* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 2005/0114580 A1* | 5/2005 | Ede | G06F 13/4081 710/305 |
| 2006/0161617 A1* | 7/2006 | Zhong | H04L 67/38 709/203 |
| 2009/0150550 A1* | 6/2009 | Barreto | H04L 29/08846 709/228 |
| 2011/0099297 A1* | 4/2011 | Hayton | G06F 9/4411 710/8 |
| 2014/0082052 A1* | 3/2014 | Kwon | H04L 67/08 709/203 |
| 2017/0102913 A1* | 4/2017 | Venkatesh | G06F 3/165 |
| 2017/0264649 A1* | 9/2017 | Sonar | H04L 65/1069 |
| 2017/0289262 A1* | 10/2017 | Vajravel | H04L 67/141 |
| 2017/0318112 A1* | 11/2017 | Johnsimon | H04L 67/2814 |
| 2017/0339234 A1* | 11/2017 | Vajravel | H04L 67/141 |

\* cited by examiner

*Primary Examiner* — Nicholas R Taylor
*Assistant Examiner* — Tania M Pena-Santana
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a thin client. The thin client establishes a remote session with a remote machine. The thin client detects a connection of a device at a first connection port. The thin client determines a category of the device. The thin client establishes a redirection channel in the remote session with the remote machine based on the category. The thin client redirects access of the device to the remote machine.

14 Claims, 9 Drawing Sheets

DEVICE REDIRECTION SUPPORT AT THIN CLIENT

BACKGROUND

Field

The present disclosure relates generally to networked computer systems, and more particularly, to techniques of auto detecting devices at a thin client and redirecting access of the devices to a remote machine.

Background

Computers are becoming increasingly ubiquitous, and are becoming pervasively integrated into the environment. For many users, this introduces the issue of configuring, maintaining and managing operating systems, applications and data on a number of computers.

A thin client device or zero client device is a client computer that operates in a client-server architecture. Thin clients are arranged to perform as little processing as possible, and the majority of the processing is performed by a server to which the thin client device is connected. This is in contrast to regular desktop or laptop computers (which can be considered "thick" clients), as the majority of the processing is performed on a local processor.

As the user's data, applications and operating systems are installed centrally on the server in a thin client architecture, the issue of configuring, maintaining and managing the computers becomes more manageable for the user. A single server can be arranged to support a large number of thin client devices. Furthermore, the lower amount of processing power used by a thin client device enables it to be made smaller and more power efficient than an equivalent "thick" client.

There are several protocols such as remote desktop protocol (RDP), HDX protocol, PC over IP (PCoIP) protocol, and virtual network computing (VNC) protocol that can provide remote access. Device redirection is a key feature in any type of remote desktop access. Typically the devices to be redirected are determined before starting the remote session from zero/thin client. Any device that gets plugged into the zero/thin client while the remote session is active may not be redirected dynamically.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a thin client. The thin client establishes a remote session with a remote machine. The thin client detects a connection of a device at a first connection port. The thin client determines a category of the device. The thin client establishes a redirection channel in the remote session with the remote machine based on the category. The thin client redirects access of the device to the remote.

DETAILED DESCRIPTION

Figure 1:
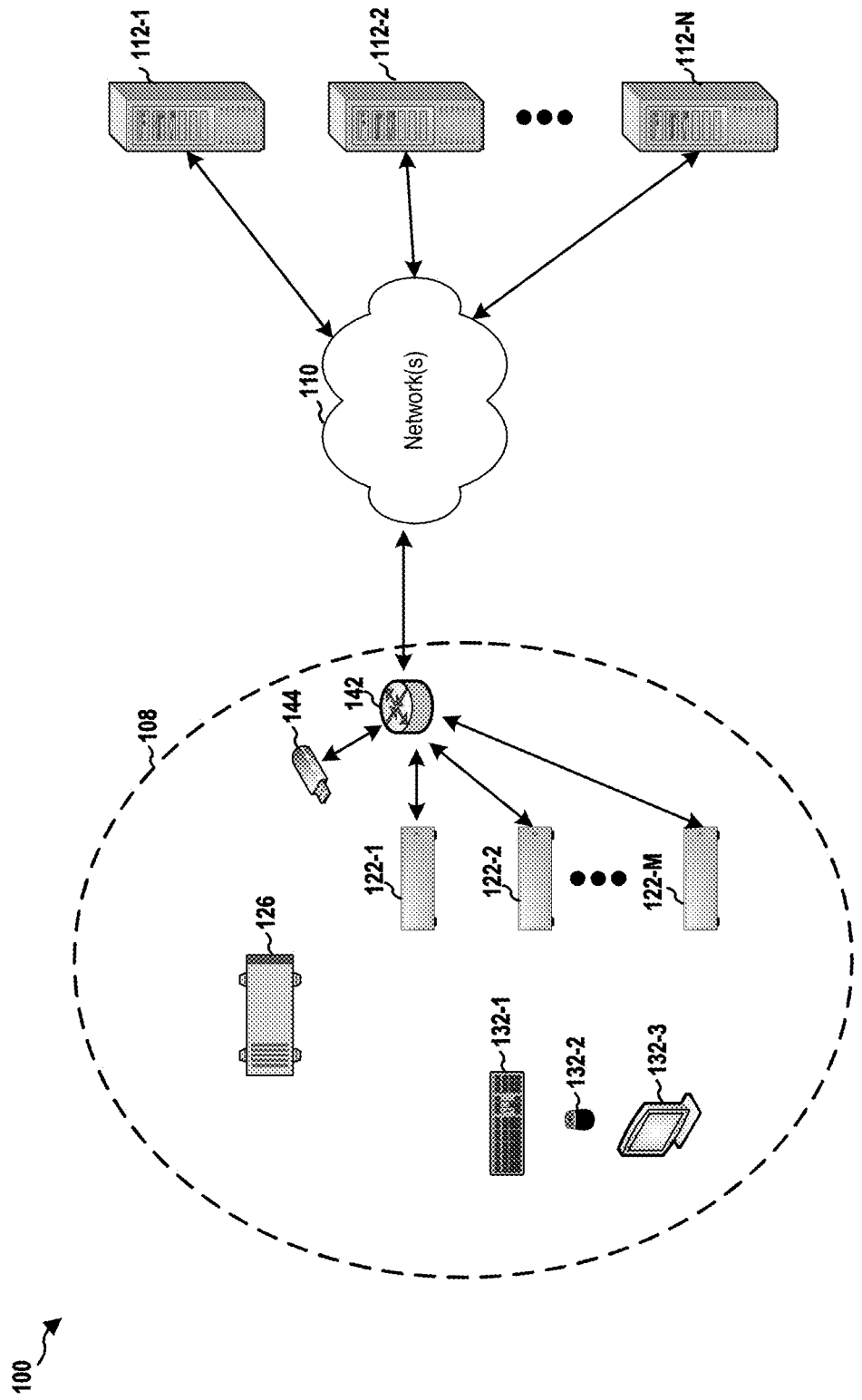
FIG. 1 is a diagram illustrating networked thin clients and remote machines.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating networked thin clients and remote machines. One or more of M thin clients 122-1, 122-2, . . . , 122-M each may be utilized to establish a respective session with one or more of N remote machines 112-1, 112-2, . . . , 112-N, M and N each being a respective integer greater than 0. In certain configurations, the thin clients 122-1, 122-2, . . . , 122-M may be in communication with the remote machines 112-1, 112-2, . . . , 112-N through a gateway 142 connected to a network 110 (e.g., Internet). A USB device 144 may be connected to the gateway 142. Each of the remote machines 112-1, 112-2, . . . , 112-N may be a virtual machine or a physical machine. Each of the thin clients 122-1, 122-2, . . . , 122-M may be wirelessly connected with one or more peripherals, e.g., peripherals 132-1, 132-2, 132-3.

Further, a remote machine manager 126 may be utilized to manage the thin clients 122-1, 122-2, . . . , 122-M, the remote machines 112-1, 112-2, . . . , 112-N, and/or the peripherals 132-1, 132-2, 132-3. The networked peripherals, the remote machine manager 126, and the thin clients 122-1, 122-2, . . . , 122-M may be in the same LAN 108, e.g., a wireless local area network (WLAN) or a wired LAN. In certain configurations, those devices may be in a different type of network.

Figure 2:
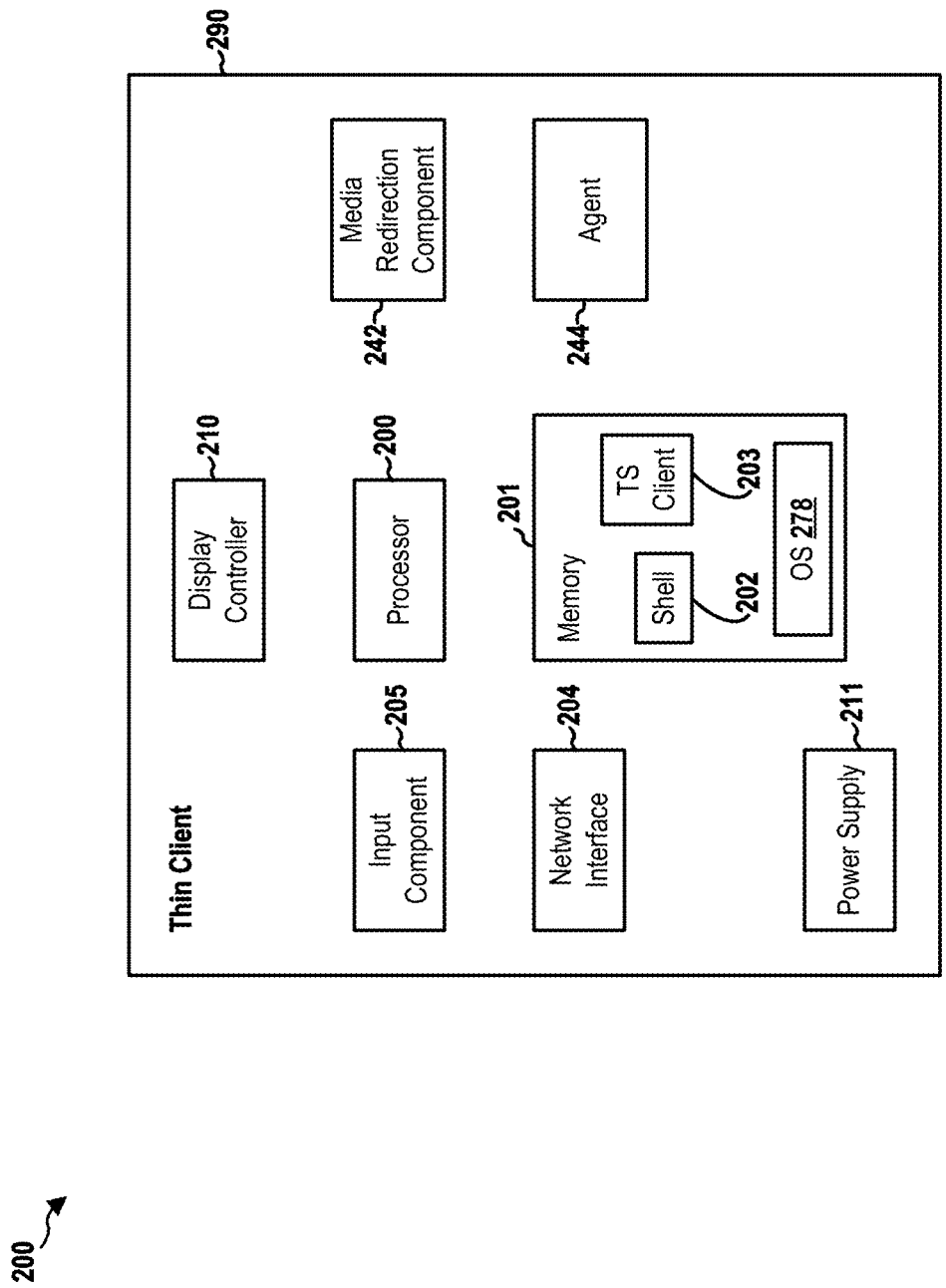
FIG. 2 is a diagram illustrating an exemplary thin client.

FIG. 2 is a diagram illustrating an exemplary thin client. A thin client 290, which may be each one of the thin clients 122-1, 122-2, . . . , 122-M, includes one or more processors 200, which can be microprocessors, controllers or any other suitable type of processors for processing computing executable instructions to control the operation of the device. The computer executable instructions can be provided using any computer-readable media, such as memory 201. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

The memory 201 is arranged to store software that is able to be executed on the processor 200. The memory 201 of the thin client device stores a software shell 202 and a terminal server (TS) client 203 application on top of an operating system (OS) 278.

A network interface 204 enables the thin client 290 to communicate over a network (in particular a wireless network) with the remote machines 112-1, 112-2, . . . , 112-N. The network interface 204 can be, for example, a WLAN interface, a cellular radio interface, a personal area network (PAN) interface, or any other suitable interface for transmitting and receiving network data. Note that in other examples, a wireless network interface can be replaced with a wired communication interface.

The thin client 290 also includes an input component 205. The input component 205 can be wirelessly connected with input peripherals (e.g., the keyboard 132-1 and the mouse 132-2) and receive input from the input peripherals.

Image output of the thin client 290 can be provided by a display controller 210. The display controller 210 may send image signals to a display peripheral. In particular, the display controller 210 may send image packets to a WLAN display via the network interface 204. The thin client 290 further comprises a power supply 211 such as a battery or a wired power source.

The thin client 290 may also include a media redirect component 242 that redirects a media device to a remote machine. Further, the thin client 290 may also include an agent 244 that can be used to communicate with the remote machine manager 126.

Figure 3:
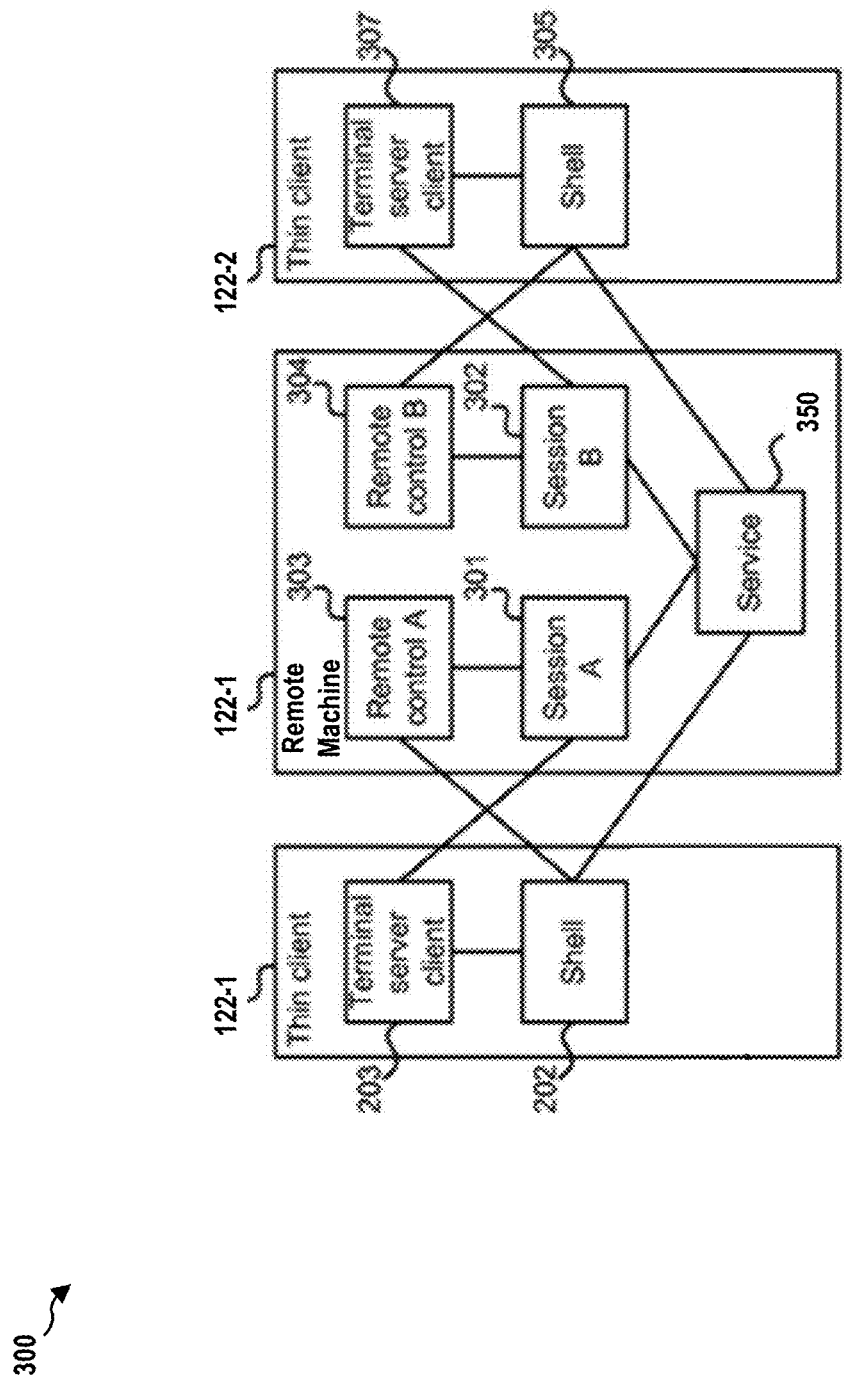
FIG. 3 is a diagram illustrating an example functional block diagram of elements in a thin client system.

FIG. 3 is a diagram 300 illustrating an example functional block diagram of the elements in a thin client system including the thin client 122-1 and the thin client 122-2 and the remote machine 112-1. The thin client 122-1 may include a shell 202 and a terminal server client 203, as described supra. The shell 202 is a lightweight control program that controls the basic operation of the thin client 122-1. In particular, the shell may determine what sessions are available on the remote machine 112-1, and may provide an interface on the display of the thin client 122-1 for the user to select a session to log into. The terminal server client 203 is a program that enables the user to interact with a particular session, and view the user interface of the session on the display of the thin client 122-1.

The remote machine 112-1 may include a software service 350 which is arranged to control and manage multiple sessions executed on the remote machine 112-1. In the example shown in FIG. 3, two sessions are running on the remote machine 112-1: session A 301 and session B 302. In other examples, more sessions could also be running on the remote machine 112-1 as well. Also note that the service 350 and sessions 301, 302 do not have to be running on the same remote machine 112-1 as shown in FIG. 3, but can be running on different remote machines. For example, instead of on the remote machine 112-1, the session 302 may be running on the remote machine 112-2.

Each session corresponds to applications and data that are accessible to one or more users. In certain configurations, a session may include a user interface of a remote desktop (i.e., a complete view of a computer desktop with several accessible applications). In certain configurations, a session may only include one or more individual applications. For example, session A 301 may correspond to a first user using a word processing application in a desktop, and session B 302 may be a stand-alone calendar application that is accessible to several users. In one example, the session is provided to the TS client 203 using a remote session protocol such as the remote desktop protocol (RDP) or virtual network computing (VNC), which may enable both desktop and application remote operation.

Each session 301, 302 on the remote machine 112-1 is optionally executing a software remote control 303, 304. The remote control 303, 304 enables the user in a session to change settings of the thin client device (even though the remote control is on the remote machine, and not on the thin client device itself). For example, these settings may include display settings at the thin client 122-1.

In the example of FIG. 3, the thin client 122-1 is accessing session A 301. The shell 202 receives data from the sensing device 206, and communicates with the TS client 203 and the session 301 on the remote machine 112-1. Session A 301 communicates with the TS client 203 and remote control A 303. Remote control A 301 communicates with the shell 202 on the thin client 122-1.

The remote machine 112-1 in FIG. 3 is also shown connected to the thin client 122-2. The thin client 122-2 has a similar structure to the thin client 122-1 in that it includes a shell 305 and a TS client 307. The thin client 122-2 is shown accessing session B 302 in FIG. 3.

Figure 4:
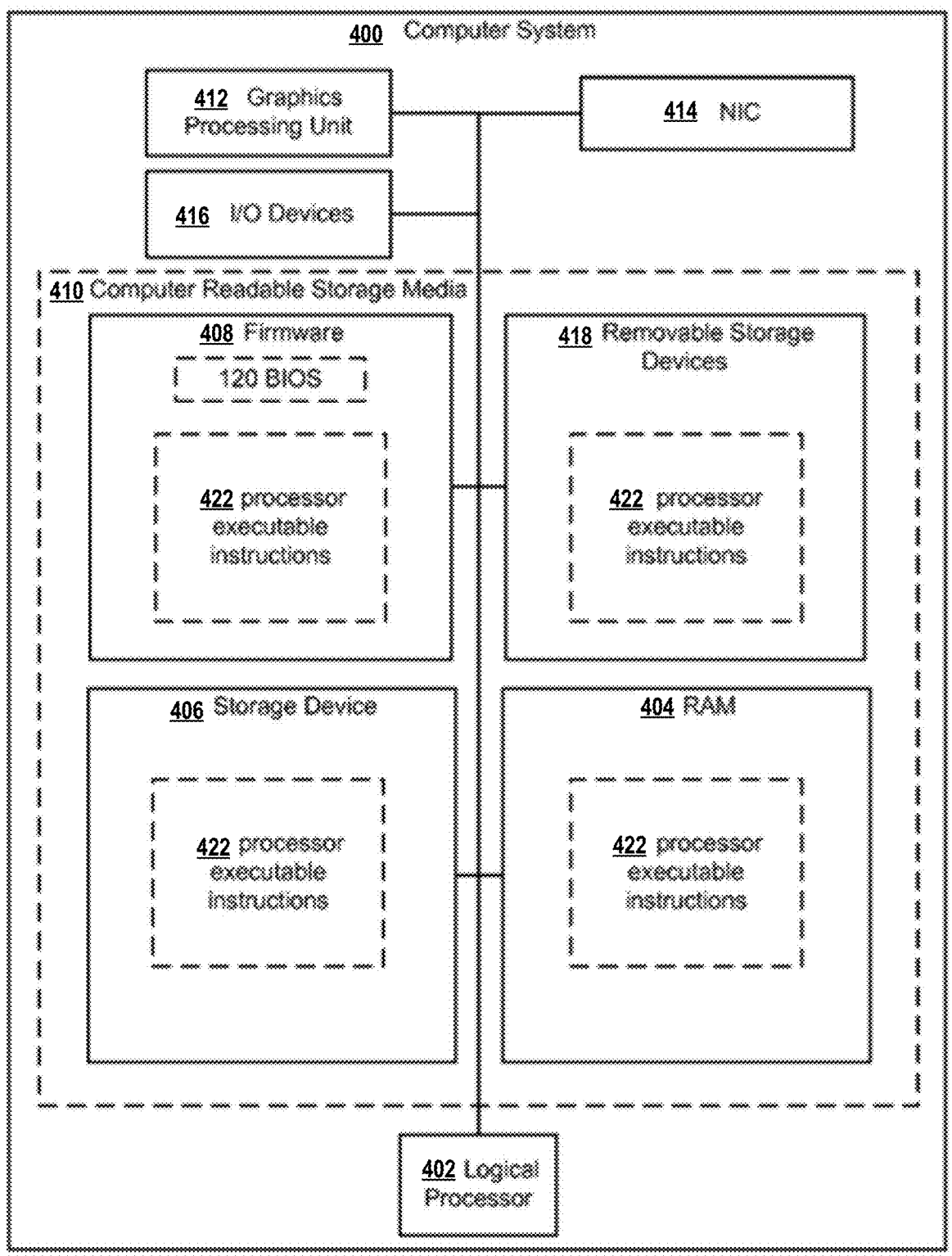
FIG. 4 is a diagram illustrating an exemplary computing system.

As described supra, each of the remote machines 112-1, 112-2, . . . , 112-N may be a virtual machine or a physical machine. Referring now to FIG. 4, an exemplary computing system 400 (i.e., a physical machine) is depicted. Computer system 400 can include logical processor 402, e.g., an execution core. While one logical processor 402 is illustrated, in other embodiments computer system 400 may have multiple logical processors, e.g., multiple execution cores per processor substrate and/or multiple processor substrates that could each have multiple execution cores. As shown by the FIG. 4, various computer readable storage media 410 can be interconnected by one or more system busses which couple various system components to the logical processor 402. The system buses may be any of several types of bus structures including a memory bus or memory controller, a peripheral bus, and a local bus using any of a variety of bus architectures. In example embodiments the computer readable storage media 410 can include for example, random access memory (RAM) 404, storage device 406, e.g., electromechanical hard drive, solid state hard drive, etc., firmware 408, e.g., FLASH RAM or ROM, and removable storage devices 418 such as, for example, CD-ROMs, floppy disks, DVDs, FLASH drives, external storage devices, etc. Other types of computer readable storage media can be used such as magnetic cassettes, flash memory cards, and/or digital video disks.

The computer readable storage media 410 can provide nonvolatile and volatile storage of processor executable instructions 422, data structures, program modules and other data for the computer 400 such as executable instructions that effectuate manager 550 described in the following figures. A basic input/output system (BIOS) 420, containing the basic routines that help to transfer information between elements within the computer system 400, such as during start up, can be stored in firmware 408. A number of programs may be stored on firmware 408, storage device 406, RAM 404, and/or removable storage devices 418, and executed by logical processor 402 including an operating system and/or application programs.

Commands and information may be received by computer 400 through input devices 416 which can include, but are not limited to, a keyboard and pointing device. Other input devices may include a microphone, joystick, game pad, scanner or the like. These and other input devices are often connected to logical processor 402 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit (GPU) 412. In addition to the display, computers typically include other peripheral output devices (not shown) such as speakers and printers. The exemplary system of FIG. 4 can also include a host adapter, Small Computer System Interface (SCSI) bus, and an external storage device connected to the SCSI bus.

Computer system 400 may operate in a networked environment using logical connections to one or more remote computers. The remote computer may be another computer, a server, a router, a network PC, a peer device or other common network node, and typically can include many or all of the elements described above relative to computer system 400.

When used in a LAN or WAN networking environment, computer system 400 can be connected to the LAN or WAN through network interface card (NIC) 414. The NIC 414, which may be internal or external, can be connected to the system bus. In a networked environment, program modules depicted relative to the computer system 400, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 5:
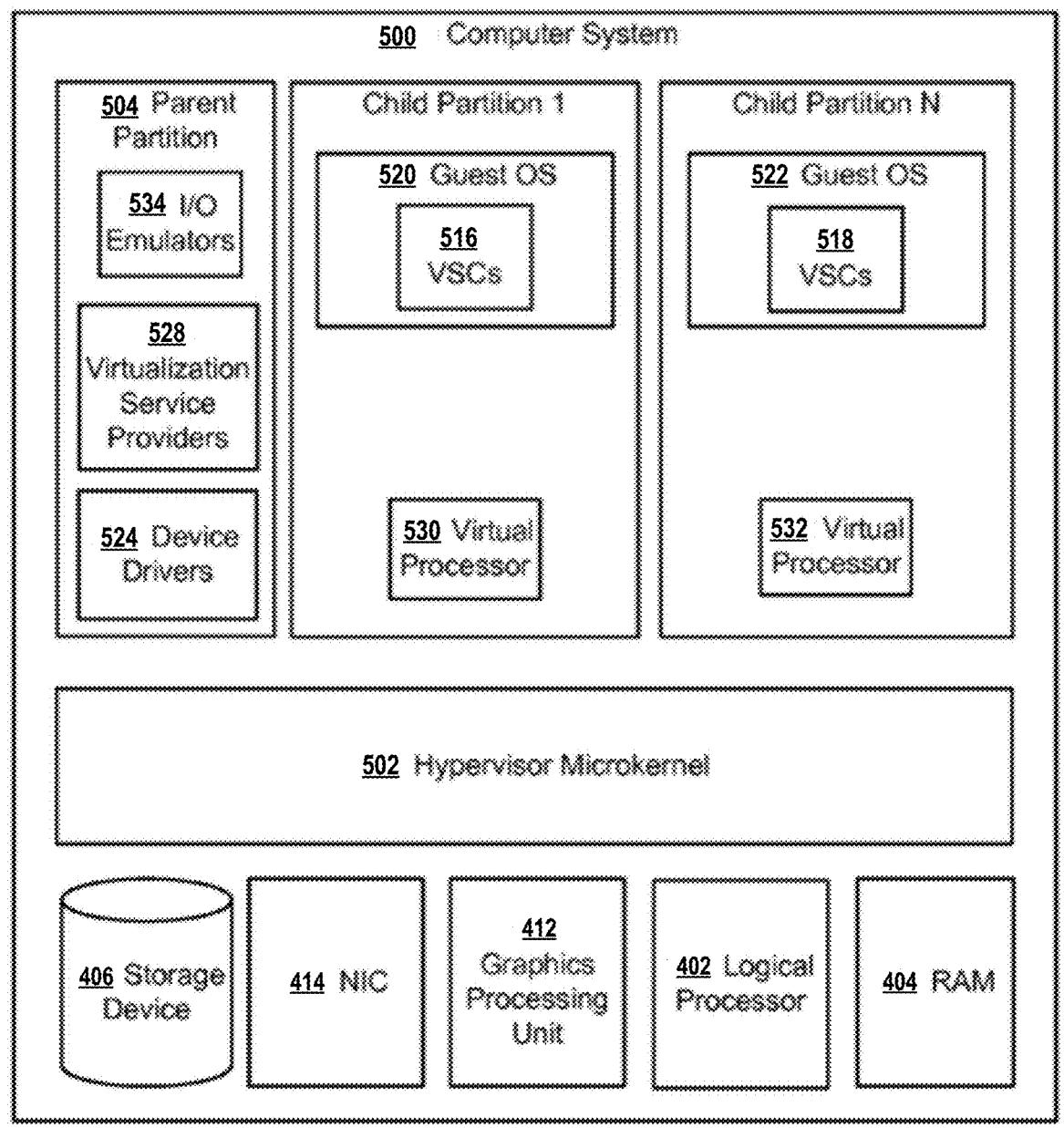
FIG. 5 is a diagram illustrating a virtual machine computing system.

Turning to FIG. 5, hypervisor microkernel 502 can be configured to control and arbitrate access to the hardware of computer system 500. The computer system 500 may employ the storage device 406, the NIC 414, the GPU 412, the logic processor 402, and the RAM 404 as described supra. Broadly, hypervisor microkernel 502 can generate execution environments called partitions such as child partition 1 through child partition N (where N is an integer greater than 1). In embodiments, a child partition is the basic unit of isolation supported by hypervisor microkernel 502. Hypervisor microkernel 502 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 502. In embodiments hypervisor microkernel 502 can be a stand-alone software product, a part of an operating system, embedded within firmware of the motherboard, specialized integrated circuits, or a combination thereof.

Hypervisor microkernel 502 can enforce partitioning by restricting a guest operating system's view of system memory. Guest physical memory (GPM) is a partition's view of memory that is controlled by hypervisor microkernel 502. System physical memory (SPM) is the memory from the view of hypervisor microkernel 502. Pages are fixed length blocks of memory with starting and ending addresses. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describe a page of memory from the viewpoint of a virtual machine and the term system physical memory is shorthand way of describing a page of memory from the viewpoint of the physical system.

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. Thus, a memory address may have a guest virtual address, a guest physical address, and a system physical address in an exemplary embodiment.

In the depicted example, parent partition component 504, which can also be also thought of as similar to domain 0 of Xen's open source hypervisor is illustrated. Parent partition 504 in this operational environment can be configured to provide resources to guest operating systems executing in the child partitions 1-N by using virtualization service providers 528 (VSPs) that are typically referred to as backend drivers in the open source community. Broadly, VSPs 528 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 534, e.g., virtualized IDE devices, virtualized video adaptors, virtualized NICs, etc., can be configured to run within the parent partition 504 and attached to resources available to guest operating systems 520 and 522. For example, when a guest OS touches a register of a virtual device or memory mapped to the virtual device microkernel hypervisor 502 can intercept the request and pass the values the guest attempted to write to an associated emulator.

Each child partition can include one or more virtual processors (530 and 532) that guest operating systems (520 and 522) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of an ARM processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (520 and 522) can be any operating system such as, for example, operating systems from MICROSOFT, APPLE, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 6:
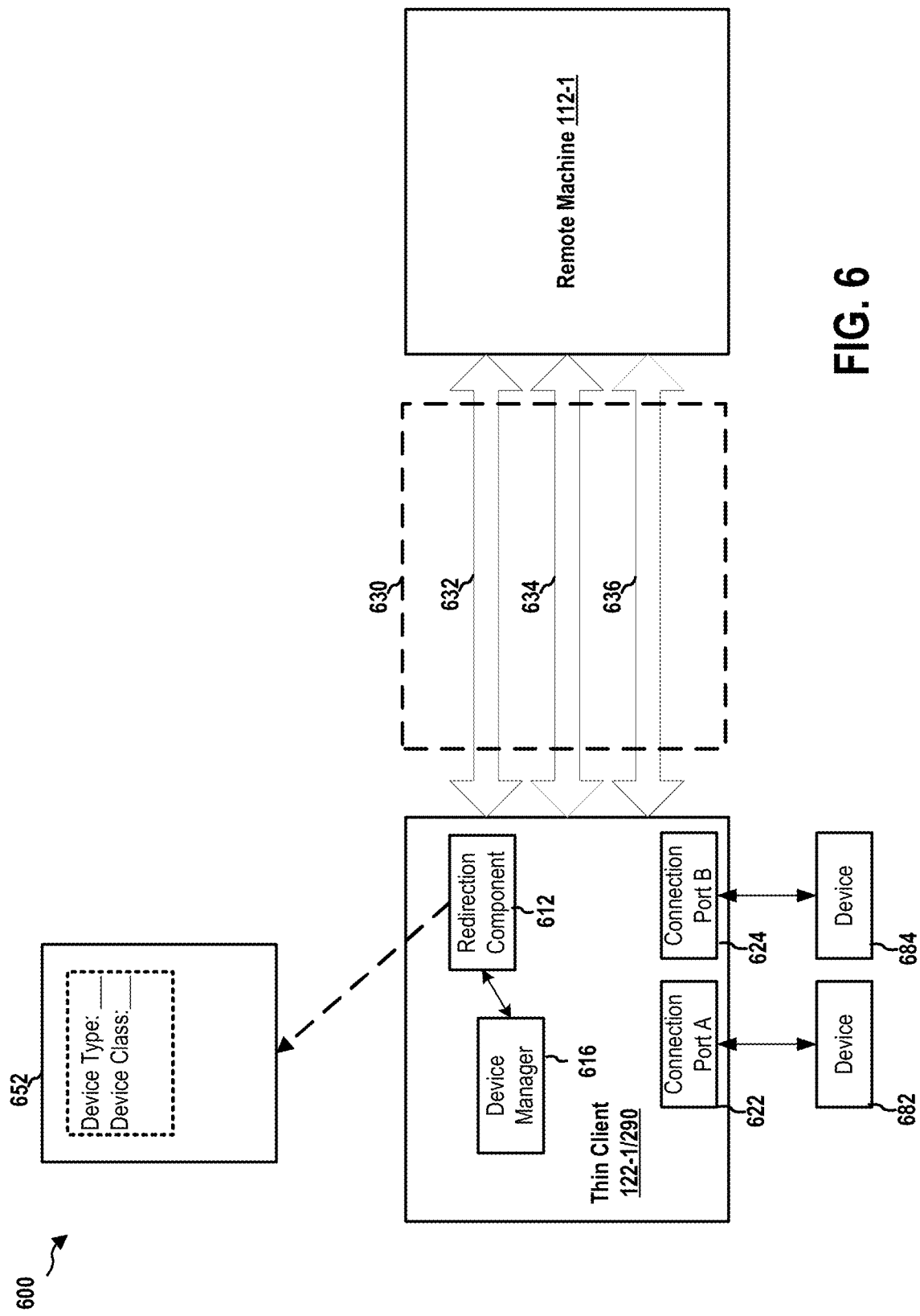
FIG. 6 is a diagram illustrating communication between a thin client and remote machine.

FIG. 6 is a diagram 600 illustrating communication between a thin client and a remote machine. Although FIG. 6 shows the thin client 122-1/thin client 290 and the remote machine 112-1, the thin client may be any of the thin clients 122-1, 122-2, . . . , 122-M and the remote machine may be any of the remote machines 112-1, 112-2, . . . , 112-N.

The thin client 122-1 may include one or more connection ports. This example shows a connection port A 622 and a connection port B 624. In particular, the connection ports 622, 624 may be USB ports in accordance with Universal Serial Bus Revision 2.0 specification or Universal Serial Bus Revision 3.0 specification, etc.

The thin client 122-1 further includes a redirection component 612, which may be the media redirect component 242. In a first configuration, the redirection component 612 registers with a device manager 616 to receive one or more events. In particular, the redirection component 612 may specify with the device manager 616 regarding the type of events that the redirection component 612 is interested in. In this example, the redirection component 612 specifies that the interested events are the connection events and disconnection events occurred at the connection ports 622, 624. A connection event may indicate what type and class of device is connected to the connection port A 622 or the connection port B 624. The connection event may include other information of the device such as specifications, setting, and configurations of the device. For example, the connection event may indicate that the connected device is a mass storage device (e.g., a flash drive) and the capacity of the mass storage device. When the connection port A 622 or the connection port B 624 is a USB port, the connection event may include specific information such as USB device type and class information in accordance with USB standards. A disconnection event may indicate what device is disconnected from the thin client 122-1 at which connection port.

In a second configuration, the redirection component 612 does not utilize a device manager 616 to receive connection events or disconnection events. Rather, the redirection component 612 may periodically poll connection ports of the thin client to obtain recently occurred connection events or disconnection events (e.g., all events occurred within a predetermined time period such as 1 second, 5 seconds, or 10 seconds from the time point of polling). In this example, upon receiving polling the requests, the connection ports 622, 624 may return recent connection events or disconnection events to the redirection component 612.

The thin client 122-1 may initiate a remote session 630 with the remote machine 112-1 based on a remote session protocol such as remote desktop protocol (RDP), HDX protocol, PC over IP (PCoIP) protocol, and virtual network computing (VNC) protocol. that can provide remote access. The redirection component 612 may establish a primary channel 632 with the remote machine 112-1 and may use the primary channel 632 to transmits actions, events, data etc. generated by the peripherals 132-1, 132-2, 132-3, for example.

In this example, a device 682 may be plugged into the connection port A 622 after the remote session 630 has been established. The device 682 registers with the device manager 616 after being connected to the thin client 122-1. The device manager 616 may generate a connection event indicating the connection of the device 682 and may send the connection event to programs, routines, applications that have registered their interest in such an event with the device manager 616.

In particular, the redirection component 612 may register with the device 684 to receive a connection event or disconnection event from the device manager 616. As described supra, the connection event may indicate that a device has been connected to a particular connection port. In this example, the redirection component 612 receives a connection event that indicates that the device 682 has been connected to the connection port A 622. The connection event may also indicate the type and class of the device. In certain configurations, the redirection component 612 may display an interface 652 and prompt the use to input type and class of the device to be used for redirection.

In this example, the connection event indicates that the device 682 is a mass storage device. The OS 278 of the thin client 122-1 may mount the device 682 and, thus, the OS 278 and the redirection component 612 have access to the device 682 (e.g., the mass storage device). Upon determining that the type and class of the storage device, the redirection component 612 may communicate with the remote machine 112-1 and establish a corresponding first secondary channel 634 with the remote machine 112-1. For example, the first secondary channel 634 may be opened specifically for redirecting access of a USB device. A redirection component of the remote machine 112-1 can accordingly emulate the device 682 as if the device 682 is plugged to the remote machine 112-1 physically. The redirection component 612 and the redirection component of the remote machine 112-1 use the first secondary channel 634 to redirect access of the device 682 to the remote machine 112-1. As such, the operating system (OS) and other programs of the remote machine 112-1 may access (e.g., read and write) files stored in the device 682 as accessing a file stored in a drive of the remote machine 112-1, for example.

In addition or alternatively, the redirection component 612 may not use the device manager 616 to receive connection events or disconnection events from the connection ports 622, 624. As described supra, the redirection component 612 may poll connection ports such as the connection ports 622, 624 to inquire about events occurred at the connection ports 622, 624. For example, the connection port B 624 may respond to the polling that a device 684 has been connected (plugged into) the connection port B 624 in a connection event. The connection event may also indicate the type and class of the device. In this example, the connection event indicates that the device 682 is a printer. The OS 278 of the thin client 122-1 may mount the device 684 and, thus, the OS 278 and the redirection component 612 have access to the device 684 (e.g., the printer). Upon determining that the type and class of the printer, the redirection component 612 may communicate with the remote machine 112-1 and establish a corresponding second secondary channel 636 with the remote machine 112-1. A redirection component of the remote machine 112-1 can accordingly emulate the device 684 as if the device 684 is plugged to the remote machine 112-1 physically. The redirection component 612 and the redirection component of the remote machine 112-1 use the second secondary channel 636 to redirect access of the device 682 to the remote machine 112-1. As such, the OS of the remote machine 112-1 may control the device 684 (e.g., the printer). The terminal server client 203 of the thin client 122-1 may accordingly instruct the OS of the remote machine 112-1 to print via the device 684.

Subsequently, the device 682 may be disconnected from the connection port A 622. In the example of utilizing the device manager 616, the device manager 616 may send a disconnection event to the redirection component 612. The disconnection event may indicate what device has been disconnected at which connection port. In this example, the disconnection event may indicate that the device 682 has been disconnected from the connection port A 622.

In addition or alternatively, the redirection component 612 may not use the device manager 616 to receive disconnection events from the connection ports 622, 624. As described supra, the redirection component 612 may poll the connection ports 622, 624 to inquire about events occurred at the connection ports 622, 624. For example, the connection port B 624 may respond to the polling that a device 684 has been disconnected (unplugged from) the connection port B 624 in a disconnection event.

Based on the identity of the disconnected device (e.g., the device 682), the redirection component 612 can determine which channel (e.g., the first secondary channel 634) is used to redirect access of that device to the remote machine 112-1. The redirection component 612 communicates with the remote machine 112-1 and terminates the primary channel 632. The OS 278 of the thin client 122-1 accordingly also dismounts the device 682 and releases the memory space used by the device 682.

Figure 7:
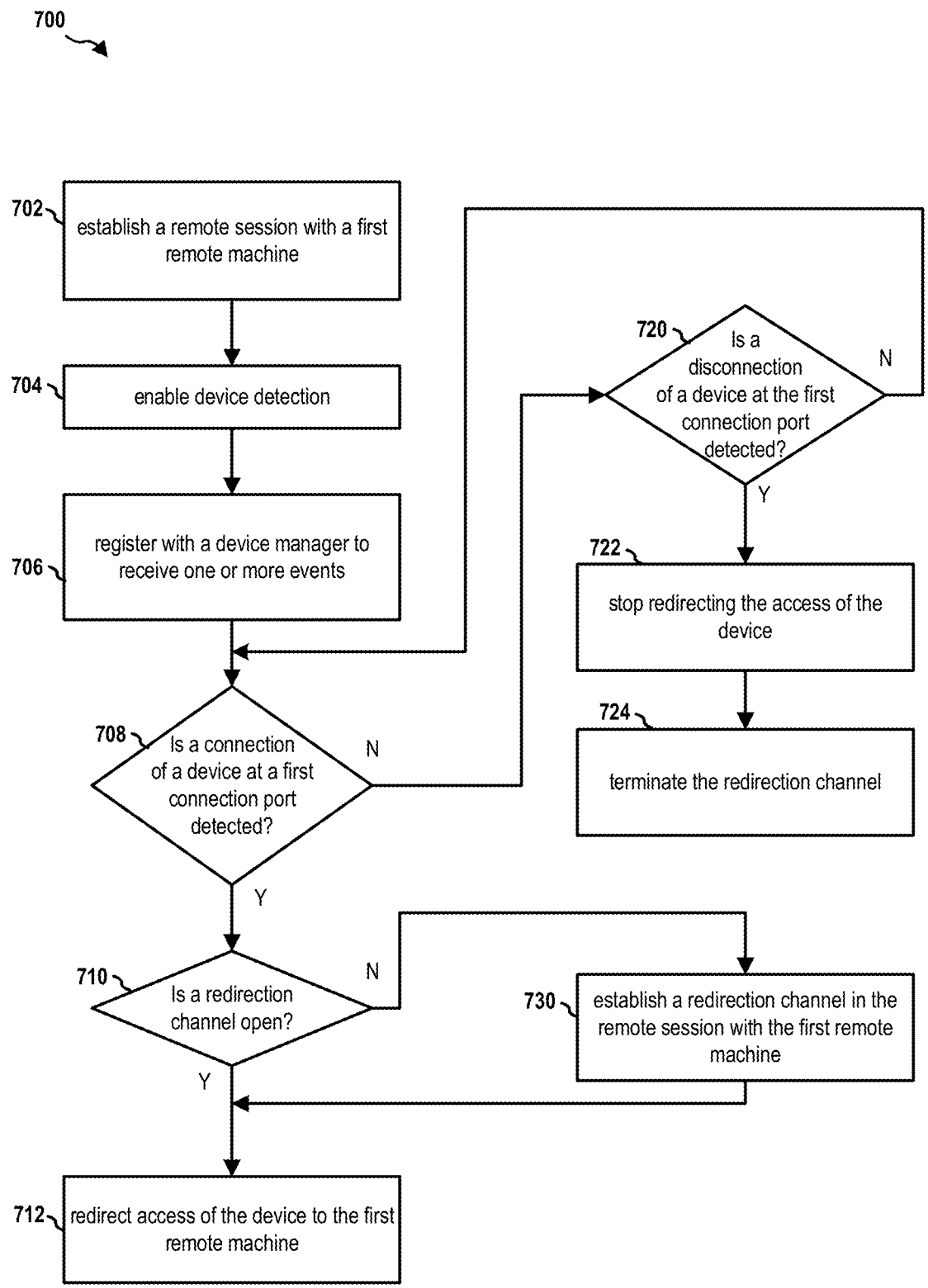
FIG. 7 is a flow chart of a method (process) for operating a thin client.

FIG. 7 is a flow chart 700 of a method (process) for operating a thin client. The method may be performed by a thin client (e.g., the thin clients 122-1, 122-2, . . . , 122-M and the apparatus 802/802'). At operation 702, the thin client establishes a remote session with a remote machine. At operation 704, the thin client enables device detection. At operation 706, the thin client registers with a device manager of the thin client to receive one or more events. At operation 708, the thin client determines whether a connection of a device is detected at a first connection port. When a connection is detected, the thin client, at operation 710, mounts the device to the thin client through the first connection port and determines whether a redirection channel is open. When a redirection channel with the remote machine is open, the thin client, at operation 712, redirects access of the device to the remote machine.

When a connection is not detected at operation 708, the thin client, at operation 720, determines whether a disconnection of the device is detected at the first connection port. When a disconnection is detected, the thin client, at operation 722, stops redirecting the access of the device. At operation 724, the thin client terminates the redirection channel. When a disconnection is not detected at operation 720, the thin client returns to operation 708.

When a redirection channel is not open as determined in operation 710, the thin client, at operation 730, determines a category of the device and the establishes a redirection channel in the remote session with the remote machine based on the category. Then the thin client proceeds to operation 712.

In certain configurations, the thin client receives the one or more events from the device manager. The detecting the connection is based on the received one or more events. In certain configurations, the thin client polls one or more connection ports of the thin client. The detecting the connection is based on responses from the polling. In certain configurations, the detecting the disconnection is based on the received one or more events. In certain configurations, the detecting the disconnection is based on responses from the polling.

Figure 8:
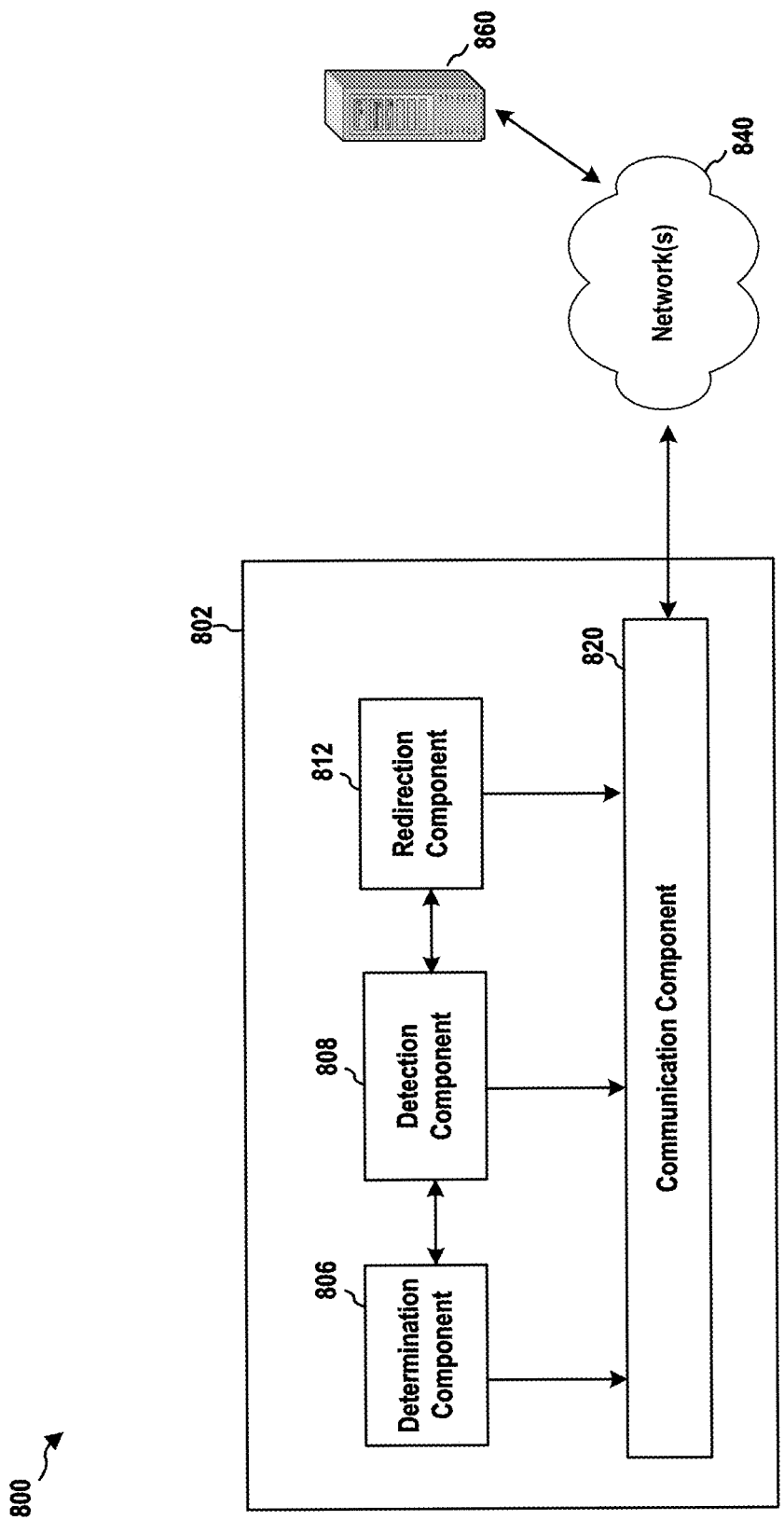
FIG. 8 is a conceptual data flow diagram illustrating the data flow between different means/components in an exemplary apparatus.

FIG. 8 is a conceptual data flow diagram 800 illustrating the data flow between different components/means in an exemplary apparatus 802. The apparatus 802 may a thin client (e.g., the thin clients 122-1, 122-2, . . . , 122-M). The apparatus 802 includes, among other components, a determination component 806, a detection component 808, a redirection component 812, and a communication component 820. The apparatus 802 may be in communication with, through one or more networks 840, a remote machine 860.

The communication component 820 establishes a remote session with the remote machine 860. The detection component 808 detects a connection of a device at a first connection port. The apparatus 802 mounts the device to the apparatus 802 through the first connection port. The determination component 806 determines a category of the device. The redirection component 812 establishes a redirection channel in the remote session with the remote machine 860 based on the category. The redirection component 812 redirects access of the device to the remote machine 860.

In certain configurations, the detection component 808 registers with a device manager of the apparatus 802 to receive one or more events. The detection component 808 receives the one or more events from the device manager. The detecting the connection is based on the received one or more events. In certain configurations, the detection component 808 polls one or more connection ports of the apparatus 802. The detecting the connection is based on responses from the polling.

In certain configurations, the detection component 808 detects a disconnection of the device at the first connection port. The redirection component 812 stops redirecting the access of the device and terminates redirection channel.

In certain configurations, the detection component 808 registers with a device manager to receive one or more events. The detection component 808 receives the one or more events from the device manager. The detecting the disconnection is based on the received one or more events. In certain configurations, the detection component 808 polls one or more connection ports of the apparatus 802. The detecting the disconnection is based on responses from the polling.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
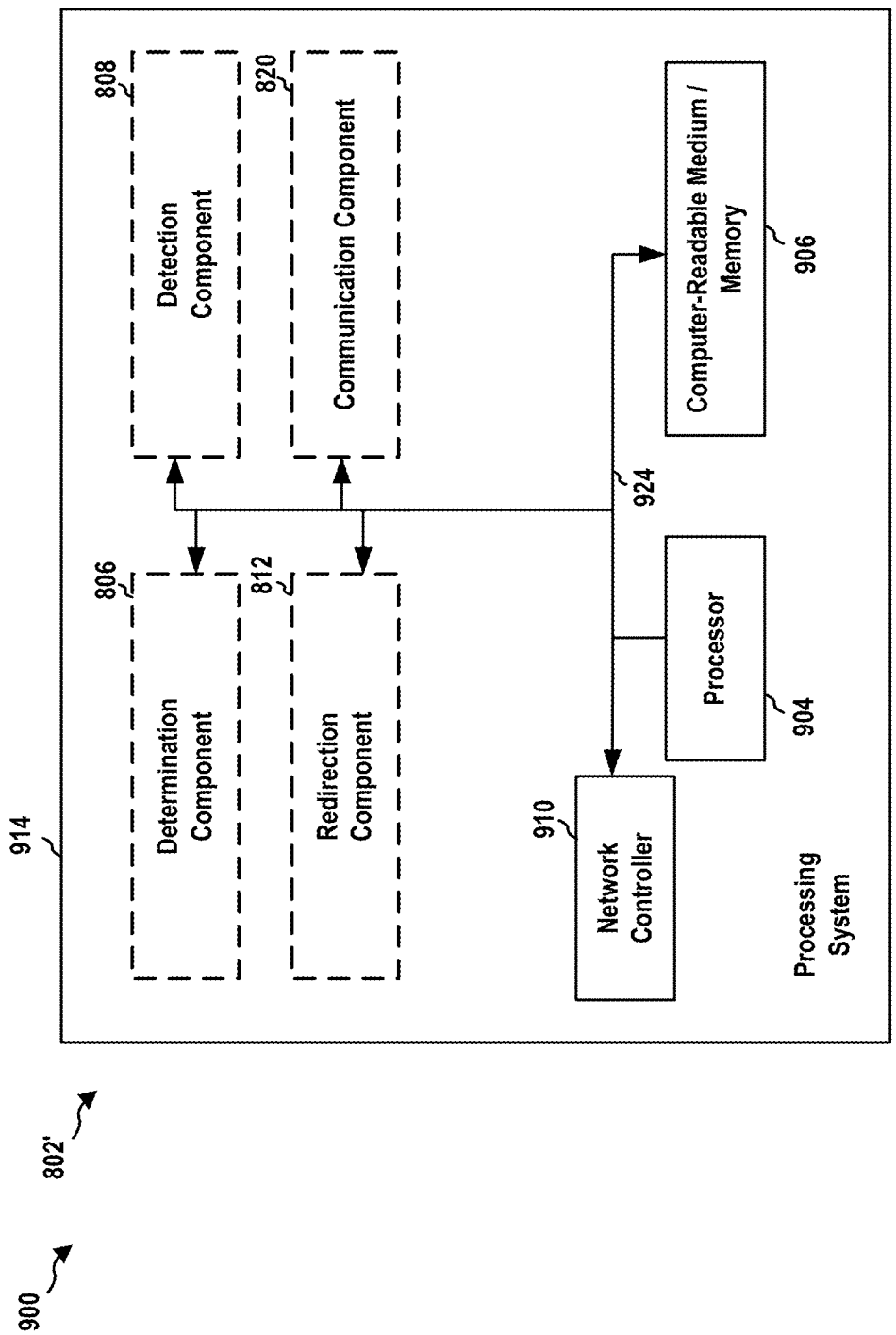
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 806, 808, 812, 820, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a network controller 910. The network controller 910 provides a means for communicating with various other apparatus over a network. The network controller 910 receives a signal from the network, extracts information from the received signal, and provides the extracted information to the processing system 914, specifically the communication component 820.

In addition, the network controller 910 receives information from the processing system 914, specifically the communication component 820, and based on the received information, generates a signal to be sent to the network. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the components 806, 808, 812, 820. The components may be software components running in the processor 904, resident/stored in the computer readable medium/memory 906, one or more hardware components coupled to the processor 904, or some combination thereof.

The apparatus 802/802' may be configured to include means for performing each of the operations described supra referring to FIG. 7. The aforementioned means may be one or more of the aforementioned components of the apparatus 802 and/or the processing system 914 of the apparatus 802' configured to perform the functions recited by the aforementioned means-.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a thin client, comprising:
   selecting, at a redirection component on the thin client, a first connection port from a plurality of connection ports at the thin client for selective redirection;
   selecting, at the redirection component, one or more events from a plurality of events occurring at the first connection port for monitoring;
   registering, at the redirection component, with a device manager of the thin client to receive the one or more events;
   receiving, by the redirection component, a connection event of the one or more events occurred at the first connection port from the device manager, the connection event indicating a type and a class of a device connected to the first connection port;
   establishing, at the thin client, a remote session with a remote machine, wherein the established remote session maintains a first channel on which data generated by peripherals of the thin client are transmitted to the remote machine;
   displaying, at the thin client, an interface that allows an input from a user indicating the type and the class of the device;
   determining, at the thin client, the type and a class of the device based on the input;
   establishing, at the thin client and in response to receiving the connection event, a redirection channel according to the type and the class of the device, the redirection channel being different from the first channel in the remote session with the remote machine;
   redirecting, at the thin client, access of the device to the remote machine;
   detecting a disconnection of the device at the first connection port;
   stopping redirecting the access of the device; and
   terminating the redirection channel.

2. The method of claim 1, further comprising polling one or more connection ports of the thin client, wherein the detecting the connection is based on responses from the polling.

3. The method of claim 1, further comprising mounting the device to the thin client through the first connection port.

4. The method of claim 1, further comprising:
   registering with a device manager to receive one or more events; and
   receiving the one or more events from the device manager, wherein the detecting the disconnection is based on the received one or more events.

5. The method of claim 1, further comprising polling one or more connection ports of the thin client, wherein the detecting the disconnection is based on responses from the polling.

6. An apparatus, the apparatus being a thin client, comprising:
   a memory; and
   at least one processor coupled to the memory and configured to:
     select, at a redirection component on the thin client, a first connection port from a plurality of connection ports at the thin client for selective redirection;
     select, at the redirection component, one or more events from a plurality of events occurring at the first connection port for monitoring;
     registering, by the redirection component, with a device manager of the thin client to receive the one or more events;
     receiving, by the redirection component, a connection event of the one or more events occurred at the first connection port from the device manager, the connection event indicating a type and a class of a device connected to the first connection port;
     establish, at the thin client, a remote session with a remote machine, wherein the established session maintains a first channel on which data generated by peripherals of the thin client are transmitted to the remote machine;
     display, at the thin client, an interface that allows an input from a user indicating the type and the class of the device;
     determine, at the thin client, the type and a class of the device based on the input;
     establish, at the thin client and in response to receiving the connection event, a redirection channel according to the type and the class of the device, the redirection channel being different from the first channel in the remote session with the remote machine;
     redirect, at the thin client, access of the device to the remote machine;
     detect a disconnection of the device at the first connection port;
     stop redirecting the access of the device; and
     terminate the redirection channel.

7. The apparatus of claim 6, wherein the at least one processor is further configured to poll one or more connection ports of the thin client, wherein the detecting the connection is based on responses from the polling.

8. The apparatus of claim 6, wherein the at least one processor is further configured to mount the device to the thin client through the first connection port.

9. The apparatus of claim 6, wherein the at least one processor is further configured to:
   register with a device manager to receive one or more events; and
   receive the one or more events from the device manager, wherein the detecting the disconnection is based on the received one or more events.

10. The apparatus of claim 6, wherein the at least one processor is further configured to poll one or more connection ports of the thin client, wherein the detecting the disconnection is based on responses from the polling.

11. A non-transitory computer-readable medium storing computer executable code for operating a thin client, comprising code to:
    select, at a redirection component on the thin client, a first connection port from a plurality of connection ports at the thin client for selective redirection;
    select, at the redirection component, one or more events from a plurality of events occurring at the first connection port for monitoring;
    registering, by the redirection component, with a device manager of the thin client to receive the one or more events;

receiving, by the redirection component, a connection event of the one or more events occurred at the first connection port from the device manager, the connection event indicating a type and a class of a device connected to the first connection port;

establish, at the thin client, a remote session with a remote machine, wherein the established session maintains a first channel on which data generated by peripherals of the thin client are transmitted to the remote machine;

display, at the thin client, an interface that allows an input from a user indicating the type and the class of the device;

determine, at the thin client, the type and a class of the device based on the input;

establish, at the thin client and in response to receiving the connection event, a redirection channel according to the type and the class of the device, the redirection channel being different from the first channel in the remote session with the remote machine;

redirect, at the thin client, access of the device to the remote machine;

detect a disconnection of the device at the first connection port;

stop redirecting the access of the device; and terminate the redirection channel.

12. The non-transitory computer-readable medium of claim 11, wherein the code is further configured to poll one or more connection ports of the thin client, wherein the detecting the connection is based on responses from the polling.

13. The non-transitory computer-readable medium of claim 11, wherein the code is further configured to mount the device to the thin client through the first connection port.

14. The non-transitory computer-readable medium of claim 11, wherein the code is further configured to:

register with a device manager to receive one or more events; and receive the one or more events from the device manager, wherein the detecting the disconnection is based on the received one or more events.

* * * * *